Dec. 8, 1970 M. NEDELEC 3,545,951
METHOD AND APPARATUS FOR SHAPING SHEET MATERIAL
Filed Feb. 27, 1967 8 Sheets-Sheet 1

INVENTOR
Maurice Nedelec

BY Bauer and Seymour

ATTORNEYS

INVENTOR
Maurice Nedelec

BY *Bauer and Seymour*

ATTORNEYS

INVENTOR
Maurice Nedelec

INVENTOR
Maurice Nedelec

BY *Bauer and Seymour*

ATTORNEYS

Dec. 8, 1970   M. NEDELEC   3,545,951
METHOD AND APPARATUS FOR SHAPING SHEET MATERIAL
Filed Feb. 27, 1967   8 Sheets-Sheet 8

INVENTOR
Maurice Nedelec

BY
ATTORNEYS

United States Patent Office 3,545,951
Patented Dec. 8, 1970

3,545,951
METHOD AND APPARATUS FOR SHAPING SHEET MATERIAL
Maurice Nedelec, Paris, France, assignor to Compagnie de Saint-Gobain, Neuilly-sur-Seine, France
Filed Feb. 27, 1967, Ser. No. 618,798
Claims priority, application France, Mar. 1, 1966, 51,472; Feb. 20, 1967, 95,637
Int. Cl. C03b 23/02
U.S. Cl. 65—104      36 Claims

ABSTRACT OF THE DISCLOSURE

A plurality of arcuately curved rods are mounted for rotation each about its own chordal axis. The axes are coplanar, parallel and spaced, and the rods are interconnected for pivoting in unison each about its own axis, from a first position wherein they are coplanar in a common plane through all axes, to a second position wherein they conjointly define a curved surface whose curvature is variable in dependence upon the angle of rotation of the rods. Sheets in bendable form are moved onto the rods in first position. The rods are then pivoted to second position and shaping means complemental to the curved surface defined by the rods, are pressed down onto the sheet to conform it to the rods, while the sheet moves continuously and after shaping passes to a cooling and tempering chamber or other processing procedure.

---

This invention relates to a method of, and an apparatus for the production of sheet material, in particular sheet glass, in curved forms and shapes.

GENERAL DESCRIPTION

In general the invention comprises a series of rods each of which has a central section or portion curved to a desired arcuate form and which conjointly determine the final curved shape of the sheet. Each of these rods terminates at its ends in trunnions which are straight, and aligned to define an axis which is a chord of the arcuate portion of the rod. All rods of the series are mounted so that these axes are parallel and uniformly spaced in and along a common plane, which may be horizontal. Furthermore all axes are at right angles to the direction of travel of the sheet during shaping thereof.

The rods, which for brevity will be termed "arcuate," may have their curved portions in the form of a part of a circle, ellipse, parabola, or other curved line. The rods are so spaced and journaled for pivoting, each about its own axis, so that each may turn or pivot from a first or zero position wherein it lies wholly in the aforesaid common plane, to a second position wherein the several planes each determined by a respective rod and its axis, are at a pre-selected angle, to the limiting angle of 90°, with the common plane. All rods may be pivoted synchronously and as a unit, between the two positions. Thus, for example where the rods are shaped as circular arcs, the sheet may be shaped to a curvature having a radius varying from infinity, as when all rods lie in their common plane, to a minimum determined by the curvature of the rods themselves when they have been pivoted to the aforesaid 90° position.

It is contemplated that the sheets as they pass over and in contact therewith, may be conformed to the shape conjointly determined by all rods considered as defining a curved surface, either by gravity or by means which press the sheets downwardly upon the rods as they pass in succession thereover.

In order to facilitate and assure passage of the sheets over and along the rods, each rod may be covered or sheathed with a bellows-like or corrugated tube which, while flexible in bending, is essentially rigid in its ability to transmit torque. Each of these bellows-like tubes encompasses and fits about its rod, throughout the length thereof, and is connected at one or both ends, with power-driven means by which all tubes are rotated in unison so that the portions thereof in contact with the sheet determine the speed of linear travel thereof. Thus the sheets may be propelled in sequence along their path of travel through the apparatus. The flexible tubes may have a covering of heat resistant fabric, for example, a woven tube of glass or asbestos fibers.

Because of this construction the sheets are translated during shaping, by pure rolling movement of the supporting tubes, so that there is no slippage with respect to the points of support.

Following shaping of the hot plastic sheet, it passes immediately to a cooling and tempering section or housing. This section may consist of a series of rods generally shaped and mounted like those previously described and each mounted for pivoting in the same manner as the rods of the forming or shaping section of the apparatus. Likewise these rods in the tempering section may be encased in flexible corrugated tubes each rotated by power means on and with respect to its respective rods.

The tempering section includes a housing enclosing the rod assemblies thereof, and incorporates jets or nozzles by which cooling and tempering fluid such as air may be blown onto the upper and lower surfaces of the curved sheets at points along the travel thereof through the section.

When a sheet is about to be moved from the heating oven into the shaping rods, all of the latter are in 0° or coplanar position. When a sheet has been fully moved onto these rods, they are pivoted in unison to the desired angle of elevation to initiate shaping. The rods in the tempering section remain in elevated position however, to receive and support each shaped sheet uniformly over its area.

Thus the apparatus is capable of the continuous production of sheets which in final form are either flat, or curved to a shape which may be varied over a wide range, followed in each case, by cooling and tempering. The oven at the upstream end of the apparatus supplies sheets in plastic condition and which, on emergence are moved directly onto the shaping rods. The sheets are continuously translated during shaping, toward the tempering section and when fully shaped, pass directly into this section.

The diameter of the sheathed rods which support the glass and which act to shape it, as well as the spacing between axes of consecutive rods, may be kept at a minimum. It is thus possible to support the sheet during shaping thereof, at points having the same density per unit area of sheet as those which define its plane of translation during heating, on rollers or gaseous support.

The actions to which the sheet is subjected during the bending or shaping operation, are progressive and the same, at the same instant over the entire area of the sheet. The forces applied are moreover normal to the direction of progress of the sheet through the apparatus. As previously noted, the radius of curvature may be widely varied by proper adjustments of the apparatus.

OBJECTS

It is the chief purpose and object of the invention to provide a method and apparatus for the efficient and low-cost production of sheets of material which in completed form are, for example, portions of the surface of a right circular cylinder. Although the invention is of great utility in the production of curved sheets in a wide variety of materials, it is of particular importance in the shaping of automobile windshields and windows.

Another object is to provide an apparatus of the character noted, wherein discrete sheets of material successively emerge from a heating oven, are curved to a selected arcuate form, and tempered and cooled, all in continuous production line procedure.

Still another object is to provide an apparatus as aforesaid which, when desired, may be used to temper glass in flat sheet form.

Yet another object is to provide an apparatus of great versatility because of the fact that it can be adapted and used to produce sheets throughout a wide range of selected curvatures and shapes.

Another object is to provide a sheet-shaping assembly which at one and the same time acts to shape the sheet while simultaneously translating it along in production line procedure.

Another object is to provide an apparatus of the type described wherein the sheets may conform to the desired curvature under their own weight or, alternatively, positively shaped by forces exerted uniformly upon the upper surface thereof.

A further object is to provide an apparatus of the type mentioned, which is adapted to essentially complete automation and so capable of producing curved sheets at minimum cost, item for item.

Other objects and advantages will become apparent to those skilled in the art, after a study of the following detailed description, in connection with the accompanying drawing.

Referring in detail to FIGS. 1 through 7, a heating oven 1 of conventional construction, contains means not shown, such as horizontal rollers or a plurality of gas jets, for supporting and translating the sheets and at the same time heating them to proper shaping temperature. The sheets emerge in succession through opening 2 in the oven wall and pass to the shaping section of the apparatus. The longitudinal extent of this section is indicated by dimension A, FIG. 1.

Figures 3, 4, 5, 13, 14, 15:
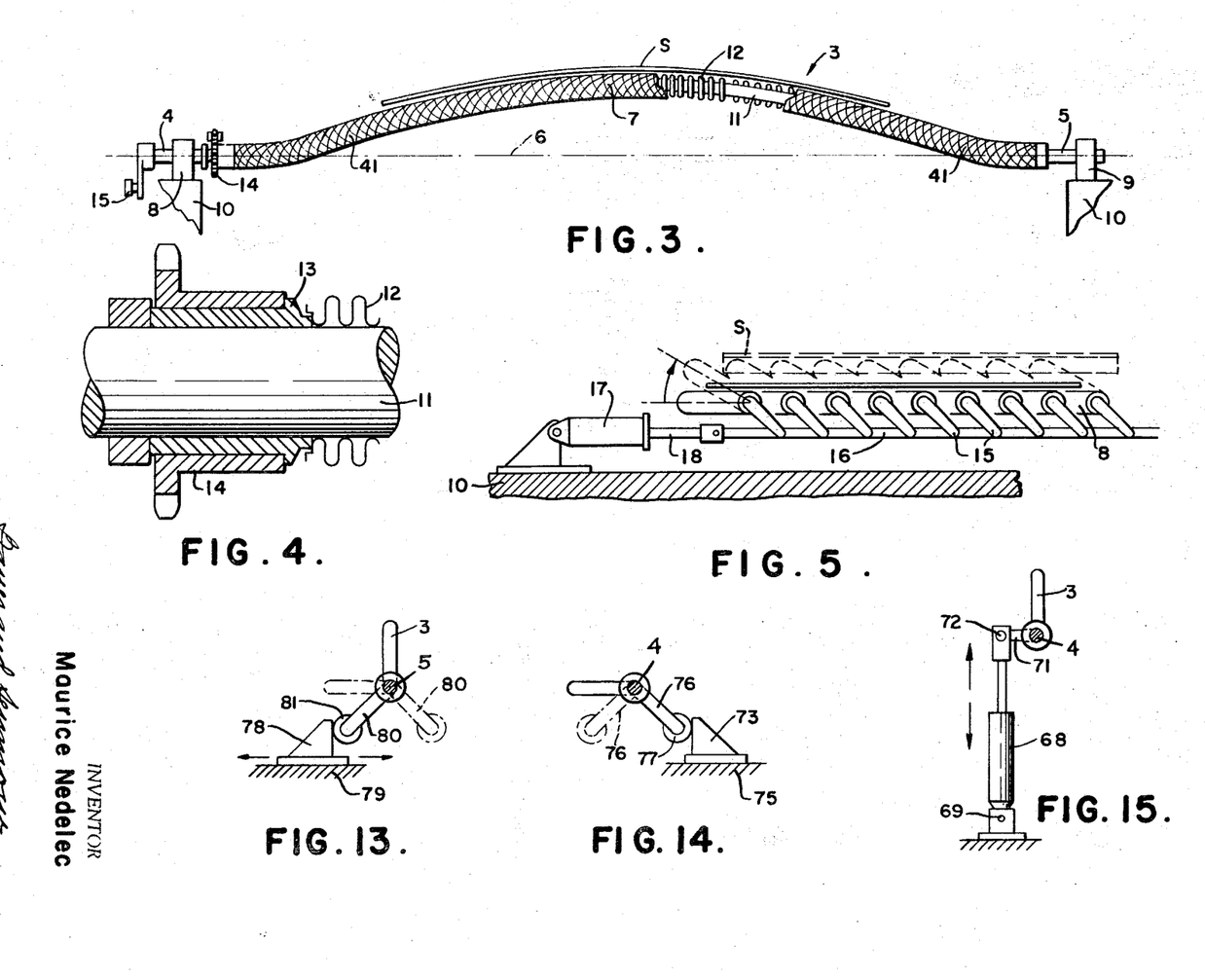
FIG. 3 is a detail view to an enlarged scale over FIGS. 1 and 2, showing one of the lower shaper rod assemblies and its pivotal mounting.
FIG. 4 is a detail sectional view to a still further enlarged scale, of the pivotal mounting for one end of the shaper rod assembly shown upon FIG. 3, and illustrating in particular how the flexible tubular covering thereof is rotated.
FIG. 5 is a detail side elevation to about the same scale as FIG. 3, showing how all of the shaper assemblies are interconnected and pivoted in unison by a single source of power.
FIG. 13 is a detail view to about the same scale as FIG. 12, taken in a plane identified by line 13—13, FIG. 11.
FIG. 14 is a detail view taken in a plane identified by line 14—14, FIG. 11.
FIG. 15 is a detail view in a plane identified by line 15—15, FIG. 11.

Shaping section A includes a plurality of arcuately curved rod assemblies generally identified at 3. As shown at FIG. 3, each of these rods has straight ends 4 and 5, left and right, having a common axis 6 and a curved central portion 7. Although this portion 7 may be a regular curve of any known geometrical form, for brevity it will be called "arcuate," it being understood that the portion 7 and axis 6 preferably lie in a common plane.

Figure 1:
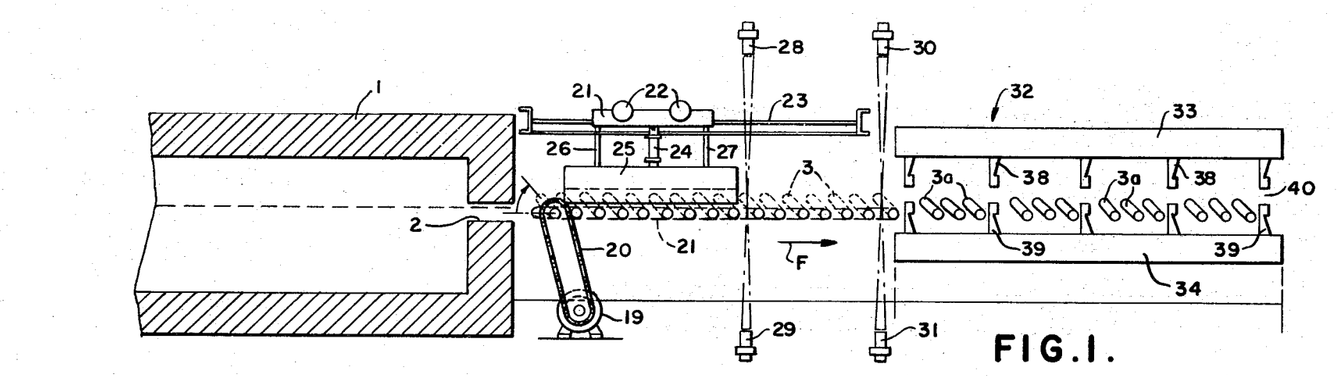
FIG. 1 is a schematic side elevation, partly in section, of the general lay-out of the apparatus, including heating oven, shaping section, and tempering and cooling chamber.
Figure 2:
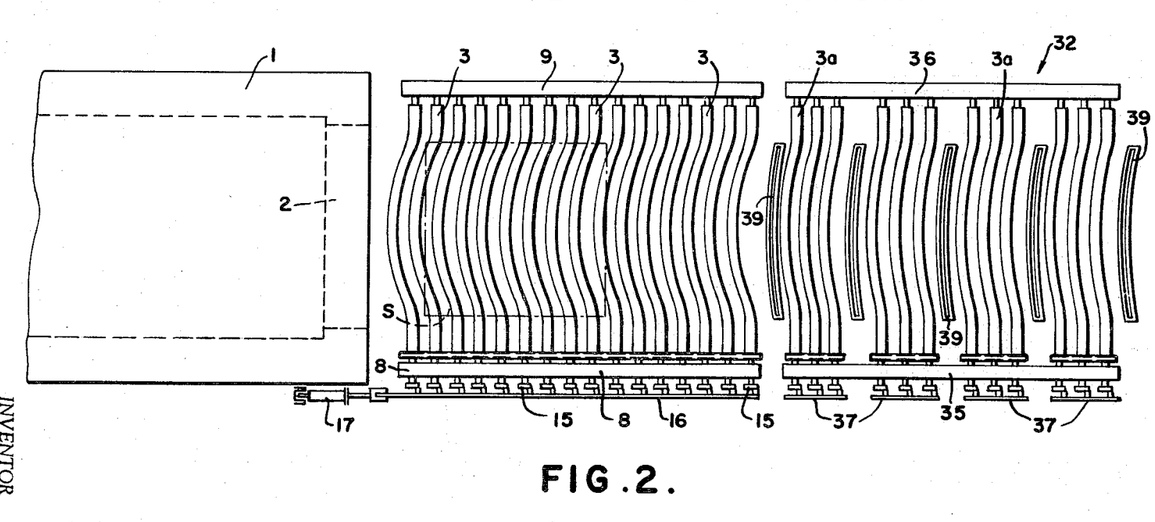
FIG. 2 is a plan view corresponding to FIG. 1.

Although not limited to any particular number or spacing, sixteen of these rods are shown upon FIGS. 1 and 2, uniformly spaced in and along the direction of travel of the sheets, as indicated by arrow F. At their ends 4 and 5 the rods are journaled in bearings carried by beams 8 and 9, respectively. The beams are fixed to any suitable foundation frame or support, as indicated at 10. In the model shown, each of these rod assemblies comprises a rod or core which may be solid or hollow, covered or sheathed with a flexible bellows-like or corrugated tube 12. This tube has a smooth fit about core 11 and, being flexible, readily conforms to the arcuate contour thereof. However, the tube is capable of transmitting torque without substantial axial twist or distortion.

As shown at FIG. 4, tube 12 at its left end is attached to collar 13 journaled on the straight end of core 11, and having the hub of pinion 14 attached thereto, so that when the pinion is turned, the entire tube rotates on and with respect to the core. At its left end as viewed upon FIG. 3, core 11 has a lever arm 15 fixed thereto. Still referring to FIG. 3, a sheet of material S, such as glass, is shown centrally supported on assembly 3 and is moving in a direction normal to the plane of the figure. It is contemplated that each tube 12 may be rotated at both ends. In such case, for example, the structure shown at FIG. 4 will be duplicated at the right end of the assembly as depicted upon FIG. 3 and all pinions 14 will be interconnected for rotation in unison and at the same angular speed, as by a motor 19. As shown, this motor may drive the pinions through a chain 20. All pinions may be connected by a second chain 21, FIG. 1, for operation in synchronism, as previously explained.

Referring to FIG. 5, a number of assemblies 3 are shown, each having its own lever 15 attached thereto. The ends of these levers are all pivotally attached to a rod 16 so that all are held in parallelism and are simultaneously pivoted, each about its own axis, by the admission of pressure fluid to one end or the other, of a hydraulic cylinder 17 having its piston rod 18 attached to the adjacent end of rod 16. See also FIG. 2.

Thus it will be noted that the radius of curvature imparted to the sheets will depend upon the angular adjustment of assemblies 3. When these all lie in a first position in a common plane determined conjointly by axes 6, the sheets will remain flat. When the assemblies are rotated to a second position 90° from the first position, so that the plane of each is normal to the aforesaid common plane, the sheets are curved to the minimum radius which, of course, is determined by the curvature originally imparted to cores 11 when manufactured. By means subsequently described, the assemblies may be releasably held in any angular position between these first and second limiting positions, as determined by the exact radius of curvature to be given to the sheets being processed.

Although under certain conditions of use and in connection with materials at high temperatures, plasticity, mass per unit area, and/or large radius of curvature, gravity may be sufficient to conform the sheets to the shape jointly determined by assemblies 3, as indicated at FIG. 3, it is contemplated that means may be provided to engage the upper surface of the sheets and to press them into conforming shape.

FIG. 1 shows schematically one such means. A carriage 21 is mounted by rollers 22 for guided translation on and along parallel tracks 23, only one of which appears in the figure. These tracks are fixedly carried by the frame of the apparatus. The carriage supports a hydraulic cylinder 24 having a piston rod which supports a form 25 under guidance by rods 26, 27, for translation in the plane of the figure, toward and from assemblies 3, under the urge of pressure fluid introduced into one end or the other of the double acting cylinder 24. This form 25 is replaceable by others and in each case its cross section in vertical planes normal to FIG. 1, is curved in correspondence with the curvature determined by the particular rotational adjustment of assemblies 3.

A first light source 28 is so mounted above the apparatus as to normally direct its beam vertically downwardly to a photoelectric cell 29. These elements are so positioned that cell 29 detects passage of the leading edge of the sheet being processed. Likewise, a second fixed light source 30 directs its beam vertically downwardly to normally energize a photoelectric cell 31. These operate to detect passage of the trailing or rearward edge of the sheet.

In operation, the assemblies 3 are in their first or coplanar position and form 25 is elevated or retracted upwardly. A sheet S is moved out of oven 1 onto these assemblies the sheaths of which are being rotated by motor 19, at the same peripheral speed as the rate it is desired to impart to the sheet in linear translation.

At the instant light from source 28 incident upon cell 29 is cut off or reduced by the leading edge of the sheet (a) pressure fluid is thereby first introduced into hydraulic cylinder 17 to rotate all assemblies 3 to their adjusted limiting positions as determined by stop means not shown, and which correspond to the desired curvature of the sheet and (b) pressure fluid is immediately thereafter introduced into cylinder 24 to thereby force form 25 downwardly upon the sheet and press it into full conformance with the curvature conjointly determined by assemblies 3. Since form 25 is translatable on the long tracks 23 it moves as a unit with the sheet to assure full and complete shaping thereof, until the leading edge of the sheet intercepts or reduces the intensity of light from source 30 incident upon cell 31. This interception (c) causes the introduction of pressure fluid into cylinder 24 below the piston therein and thus to raise form 25 from the sheet, and (d) introduces pressure fluid after a certain time delay, into cylinder 17 to thus restore all assemblies 3 to coplanar first position. The time delay is sufficient to enable the shaped sheet to pass onto the supporting means within a tempering and cooling section of the apparatus, generally identified at 32. The forming section is thus readied for the next sheet from oven 1.

The tempering and cooling section, the extent of which is indicated by dimension B, FIG. 1, consists generally of an enclosure having upper hollow walls 33, lower hollow walls 34, and with end walls having entrance and exit openings in alignment with the path of travel of the sheets as they pass from forming section A. Within the enclosure or housing first and second bearing beams 35 and 36 aligned respectively with beams 8 and 9, journal between them a plurality of assemblies 3a each of which may be like assemblies 3 previously described. As clearly shown upon FIGS. 1 and 2, these items 3a are conveniently arranged in groups of three with a space between each group.

All rod assemblies 3a are, by means generally identified at 37, interconnected for pivoting in unison. Such means may be similar to those previously described in connection with FIG. 5. However, rods 3a are not cyclically pivoted as are rods 3, but are maintained in their positions of pivotal adjustment unless and until sheets of a different curvature are to be produced. The additional spaces between groups of rod assemblies 3a are provided to accommodate nozzles 38 and 39, upper and lower. These nozzles are supplied with cooling fluid such as air under pressure, from the respective hollow boxes or walls 33 and 34, and direct the fluid onto the upper and lower surfaces of the sheets as they pass in succession through section 32. As previously explained, rod assemblies 3a may also be provided with flexible corrugated tubes, each like item 12, and all of them simultaneously rotated, each upon its curved rod, to translate the sheets at such speed as will assure its proper tempering and cooling to set form by the time each emerges from the exit opening at 40.

As shown upon FIG. 3, at 41, the tubes 12 of assemblies 3 and 3a may be covered with tubular woven heat-resistant fabric of silica or asbestos fibers to thus protect the tubes and to prevent any marking or marring of the plastic sheets.

Figure 6:
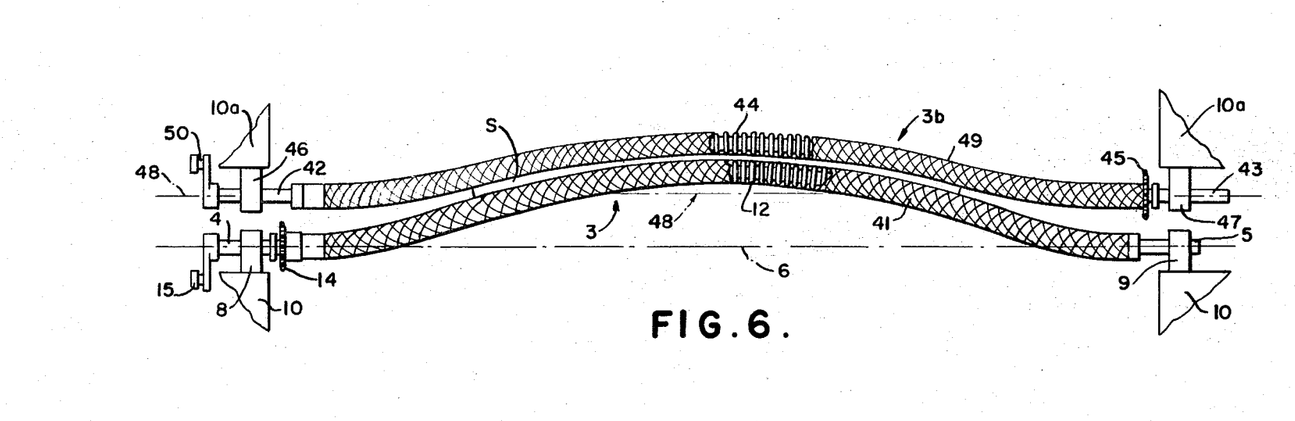
FIG. 6 is a view like FIG. 3, but showing a form wherein the sheets are positively shaped by passage between upper and lower sets of shaper assemblies both conforming generally to the desired curvature of the completed sheet.
Figure 7:
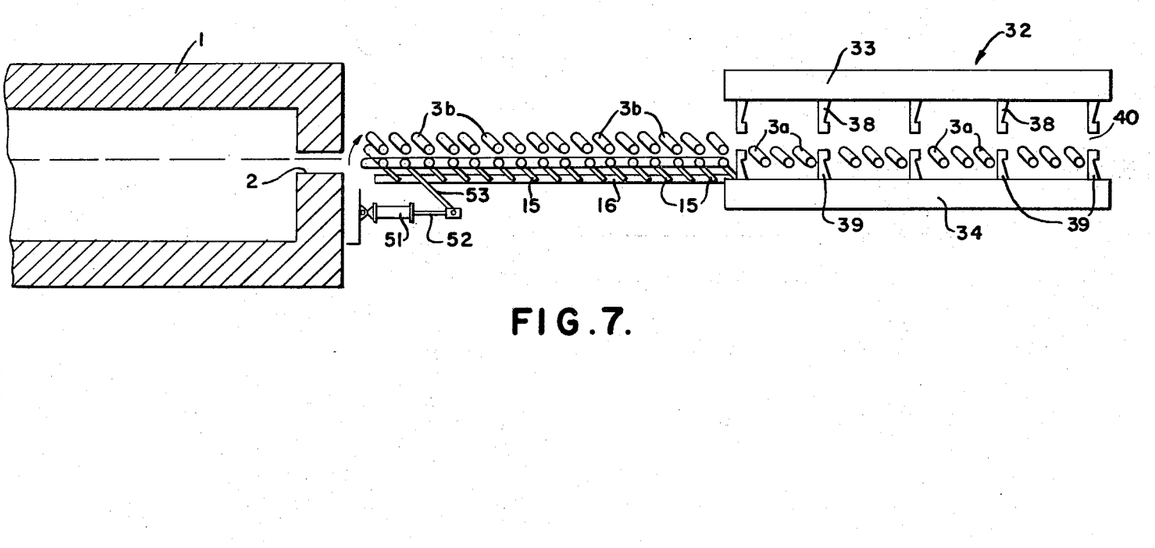
FIG. 7 is a schematic side elevation like FIG. 1, wherein the apparatus is equipped with a plurality of pairs of upper and lower shaping rod assemblies like the pair depicted upon FIG. 6.

FIGS. 6 and 7 show an alternative arrangement wherein the shaping form 25, FIG. 1, and its supporting and actuating means, are replaced by a set of upper rod assemblies like 3, previously described. Since the general construction and arrangement may be like that previously described in connection with FIGS. 1 through 5, the same reference numerals have been used to identify like parts; and it is sufficient to mention oven 1, lever arms 15, connecting rod 16, and tempering and cooling section 32.

However, in the forming section of the apparatus, a second and upper set of curved rod assemblies 3b are provided as schematically shown upon FIG. 7. Referring to FIG. 6, each of these assemblies 3b is generally like assemblies 3, and consists of a solid or tubular metal core having straight ends 42, 43, interconnected by an arcuately shaped central portion. A corrugated flexible metal tube or sheath 44 has a smooth fit about each respective core and, as indicated at 45, FIG. 6, has a driving pinion connected to its right end. As will be understood, all pinions 45 are connected as by a chain, for synchronous rotation of the tubes by a motor, not shown, but similar in purpose and connections, to motor 19, FIG. 1.

Continuing reference to FIG. 6, the straight ends 42, 43 of assembly 3b are journaled in respective bearings 46, 47, for pivotal adjustment about their common axis 48. These bearings may be carried by parts connected with the frame, as indicated at 10a. A flexible tubular covering 49 fits about tube 44.

At its left end 42 each rod of the assemblies 3b, has a lever arm 50 fixed thereto. The ends of these are interconnected by a rod, not shown, but in all respects and purposes, like rod 16, FIGS. 2 and 5. In the particular model being described in connection with FIGS. 6 and 7, both connecting rods may be operated by and from a single hydraulic cylinder 51 having the free end of its piston rod 52 pivotally attached to the free end of a lever 53. The two rods are interconnected for movement in unison and as a unit; but since, as shown upon FIG. 6, the two lever arms extend in opposite directions, the group of assemblies 3b pivot in a direction opposite from that of assemblies 3, for one and the same direction of translation of the connecting rods.

FIG. 6 shows the position of the rod assemblies when each has been rotated to full shaping position about respective axes 6 and 48, wherein they are spaced by a distance just sufficient to receive sheet S between them. It will be noted, moreover, that when these two groups of assemblies have been turned from the position shown, each through 90°, into horizontal planes through axes 6 and 48 respectively, the two groups are vertically spaced by a distance substantially equal to the distance between these axes.

The operation of this form will be clear from the foregoing description. When the rod assemblies are simultaneously turned to positions wherein each group lies in its common plane through axis 6 and axis 48, assemblies 3 are in position to receive a sheet as it comes in planar form from oven 1. As the sheet becomes fully supported on these assemblies, both groups are pivoted for example, to the positions shown upon FIG. 6, to thereby positively force the sheet into the desired curved form or shape. At the same time the sheet is being translated until, as it passes into tempering and cooling section B it is fully shaped and is supported therein by assemblies 3a, in full and uniform surface contact over its entire area.

FIGS. 8 through 19 show in greater detail an embodiment of the invention as previously explained in connection with schematic views 1 through 7.

Figure 8:
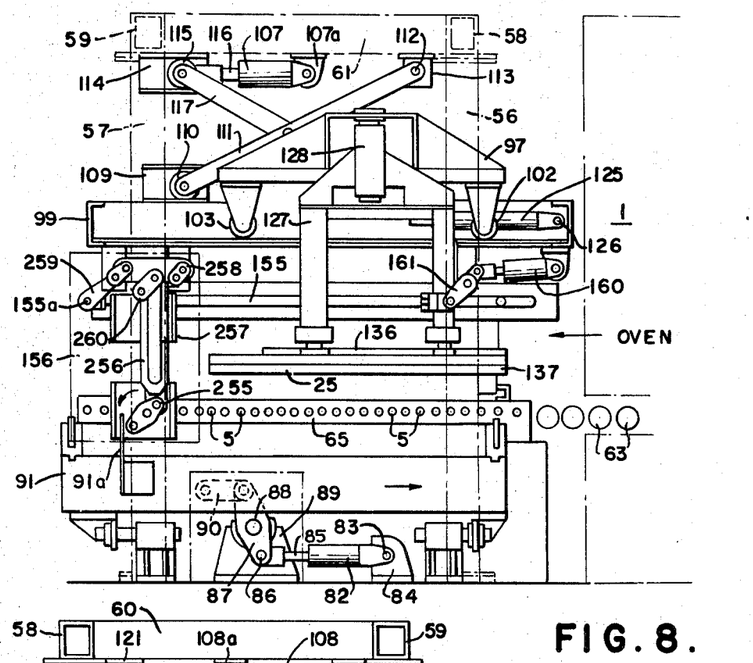
FIG. 8 is a side elevation showing a complete forming machine, the heating oven being shown at the right.
Figure 9:
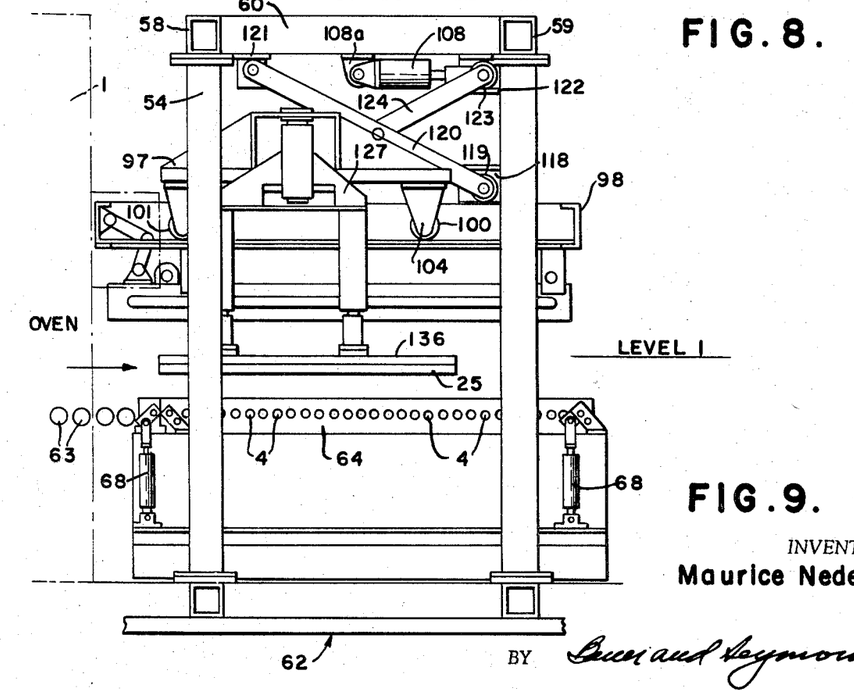
FIG. 9 is an elevation of the forming machine as seen from the side opposite to that of FIG. 8.
Figure 10:
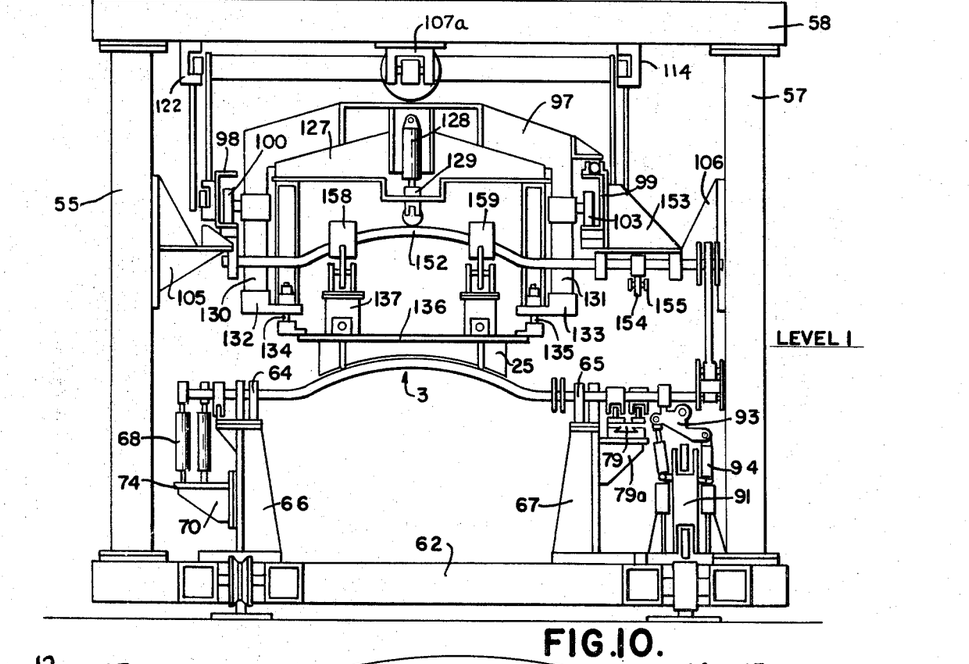
FIG. 10 is an end elevation of the machine of FIGS. 8 and 9.

Referring more particularly to FIGS. 8, 9 and 10, the frame of the machine comprises generally a first pair of vertical columns 54, 55, FIG. 9, spaced at one side, and a second pair 56, 57 equally spaced at the other side. The columns are at the respective corners of a rectangle and are rigidly interconnected at their top ends by transverse beams 58, 59, and by longitudinally extending beams 60, 61. The beams are rigidly united into a parallel-epipedal frame which, in a manner subsequently described, is mounted for adjustment in and along two mutually normal horizontal axes, one in the direction of travel of the sheets and the other transversely of that direction. The frame is generally identified at 62, FIGS. 9 and 10.

Oven 1 in which the sheets are heated, is shown at the right of FIG. 8, and at the left of FIG. 9. The heated sheets are transported from the oven, into the shaping means, by horizontally coplanar rollers 63.

The arcuate rod assemblies corresponding in purpose and general construction to the one identified at 3, FIG. 3, and previously described, are supported by and journaled at their respective straight aligned ends, by longitudinally-extending plates 64, left and 65, right, FIG. 10. Each plate is supported in horizontal position at about the level of rollers 63, by a respective pair of posts. One post of one pair is identified at 66 and one of the other pair at 67, FIG. 10. All four are rigidly secured to and supported by frame 62. As will be understood from the previous description of FIGS. 1 to 7, and also from inspection of FIGS. 8 and 9, the bearings for each rod define a respective one of a plurality of horizontal, uniformly horizontally spaced axes, all of which are coplanar and define a plane hereinafter termed the "base plane." Since each of these shaping rod assemblies may be like the one generally identified at 3, FIG. 3, and specifically described in connection with FIGS. 3 and 4, it is unnecessary to repeat the description. One of these assemblies is identified at 3, FIGS. 10 and 11. The respective ends of the rod assemblies 3 are indicated at 4, FIGS. 9 and 5, FIG. 8, from which it is noted that the assemblies are uniformly spaced.

Figures 11, 12:
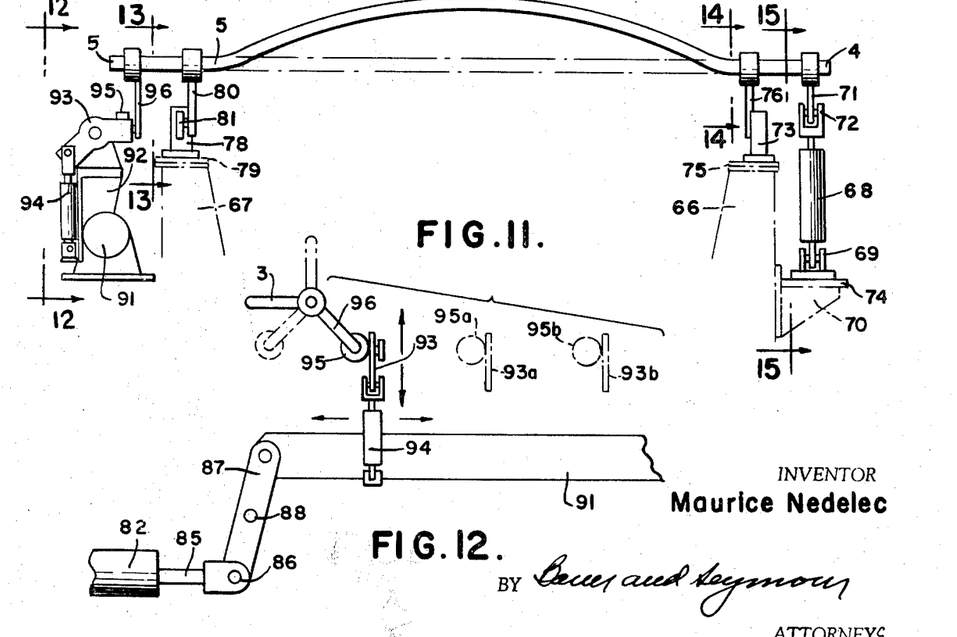
FIG. 11 is an end elevation to a scale enlarged over that of FIGS. 8, 9 and 10, showing one of the shaper elements and the power-operated means by which all of these elements are pivoted as a group about their axes, through a selected angle.
FIG. 12 is a side view to an enlarged scale, as seen in a plane identified by line 12—12, FIG. 11.

Referring particularly to FIG. 11, rod 3 is shown in dotted lines in one limiting position wherein its plane is erect and at 90° to the base plane. The full lines show its position coplanar with the base plane. Each of the rods is held in its elevated or operating position, and which may be at 90° as shown or at any intermediate angle between 0° and 90°, by a respective one of a plurality of hydraulic cylinders 68, FIGS. 11 and 15. Each cylinder has its closed end pivoted at 69 to a plate 74 carried by brackets 70 one of which is identified at FIG. 11, and which is fixed to and rigidly supported by posts such as 66. A lever arm 71 is fixed to the contiguous straight end 4 of rod 11 of assembly 3 and its free end is pivotally connected at 72 with the end of piston rod of cylinder 68. Thus when fluid under pressure is admitted to the lower end of cylinder 68, each rod is positively held in the position determined by an abutment 78, FIG. 13, subsequently described.

Referring to FIGS. 11 and 14, a stop block or abutment 73 is fixed to a horizontal plate 75 carried by and secured to the tops of posts like 66. A lever arm 76 has an integral collar secured to the straight end 4 of rod 11 and supports a roller 77 at its free end. As shown upon FIG. 14, arm 76 is so adjusted that when the plane of rod 11 coincides with the common plane, roller 77 abuts block 73 to limit further rotation below the base plane.

Referring to FIGS. 11 and 13, an abutment or stop block 78 is attached to plate 79 for longitudinal adjustment therealong. This plate is secured to and carried by posts such as 67. From FIG. 10 it is seen that plate 79 may be mounted as by a dovetail connection, for longitudinal adjustment along a second plate fixed to brackets 79a. In this way all abutments may be adjusted in a direction normal to the plane of the figure, as a unit, and releasably held in adjusted position in accordance with the desired angle to which all of the rod assemblies are to be pivoted in shaping of any particular run or batch of sheets.

Returning to FIG. 11, a lever arm 80 has a collar adjustably fixed to the straight left end 5 of rod 11. A roller 81 journaled on the free end of the arm, is positioned to engage abutment 78 and to thus limit rotation or pivotal adjustment of the rod, to a position which will depend upon the adjusted position of blocks 78. On this figure, the dotted line positions of rod 11 and arm 80 are those occupied when roller 77, FIG. 14, abuts stop 73. Likewise, the dotted line position of arm 76, FIG. 14, is that occupied when roller 81, FIG. 13, abuts stop 78 and the latter has been longitudinally adjusted for the full 90° angle of the rod assemblies with respect to the base plane common to their axes.

It will be understood that each of the rod assemblies 3 is equipped with a hydraulic cylinder like 68, stops like 73, 78 and associated parts, as just described in the immediately preceding paragraphs, so that by means schematically shown and described in connection with FIGS. 1, 2 and 5, and presently set forth in detail, simultaneous admission of pressure fluid to all cylinders 68, below the pistons therein, urges all rods into the full 90° pivotal position shown at FIGS. 13 and 15. Likewise admission of fluid under pressure to cylinders 68 above the pistons therein, urges all rods to the 0° pivotal position of FIG. 14. All rod assemblies 3 are pivoted in unison.

Means are provided whereby the pivotal positions of the rod assemblies may be pre-selected so that, when desired, the angle from the aforesaid 0° position can be positively varied and the rods stopped at any angular value between 0° and 90°. Referring to FIG. 8 in general, and to FIGS. 11 and 12 in particular, a hydraulic cylinder 82 has its end pivoted at 83 to a bracket 84 fixed to the base or frame of the apparatus. The end of piston rod 85 is pivotally connected at 86 to one end of a lever 87, fulcrumed between its ends at 88 to a pivot block 89, likewise fixed to the frame. As best shown upon FIG. 8, the upper end of lever 87 is pivoted to a link 90 by which it is connected to a horizontal bar 91 mounted for sliding in the direction of its length, on and with respect to frame 62. The bar subtends all of the rod assemblies 3 and has fixed along it in spaced relation, one for each rod, a stop mechanism, like the one shown upon FIGS. 11 and 12. Each of these mechanisms consists of a support 92 adjustably fixed to the bar and at its upper end pivotally mounting a stop lever 93.

One end of lever 93 is pivotally connected to the end of the piston rod of a hydraulic cylinder 94, having its lower end pivoted to a depending integral portion of support 92. The construction and arrangement are such that when pressure fluid is admitted to the top end of cylinder 94, the force of the piston therein moves the free end of lever 93 into the path of a roller 95 journaled on the end of a lever arm 96 adjustable fixed to the straight portion 5 of rod 12. Reference to FIGS. 11 and 12 shows how, when lever 93 is in the position shown, translation of bar 91 pivots the corresponding one of the rods, from the base plane or 0° position indicated in full lines upon FIG. 12, to an elevated position between 0° and 90° as determined by the adjusted position of abutment 78.

When, under the action of pressure fluid admitted to the lower end of cylinder 94, lever 93 has been pivoted clockwise, FIG. 12, to its other limiting position, its free end is clear of the path of roller 95, and translation of bar 91 then has no effect upon the corresponding one of rod assemblies 3. Bar 91 has fixed thereto, in spaced relation therealong, a plurality of the assemblies just described, there being one for each rod assembly. This is indicated in dotted lines 93a, 95a, 93b, 95b, FIG. 12. Fluid under pressure may be admitted simultaneously to all cylinders 94, or may be cut off from one or more of these cylinders, by valve means, not shown.

Thus each lever 93 may be positioned upon either side of its roller 95. When on the one side shown at FIG. 12, the corresponding rod assembly 3 is elevated from the base plane position by movement of bar 91 to the left. Conversely, when the lever is on the other side of its roller 95, it may be lowered to the base plane position independently of bar 91. Since each rod assembly is reld in its elevated position by fluid pressure effective in the respective one of cylinders 68, pressure in cylinder 82 may be released after the rods are in elevated or shaping positions, and bar 91 returned to initial position in readiness for the next cycle of operation.

THE UPPER SHAPING APPARATUS

Each sheet as it is moved from the oven onto the arcuate forms or rod assemblies described in the preceding paragraphs, must first be centralized on these forms, with respect to a central longitudinal axis parallel with the direction of travel of the sheet during shapping thereof. Further, where gravity alone is not sufficient to fully conform the sheet to the curved shape conjointly defined by the forms, means are provided to press the sheet downwardly to force it into full conformance.

The apparatus for accomplishing these functions is mounted upon a main carriage 97, FIG. 8, 9 and 10, and is generally of inverted U-shape. A pair of channel tracks 98, 99 are interconnected and form guides for two pairs of rollers. One pair 100, 101 support the main carriage for translation along beam 98, FIG. 9. The other pair 102, 103 support it for translation on and along track 99, FIG. 8. As shown, each roller is journaled in a bracket such as the one shown at 104 for roller 100, FIG. 9. The four brackets are alike and are rigidly affixed to carriage 97. Each roller 100, 101, etc. is mounted by eccentric means not shown, so that its axis of rotation may be slightly vertically adjusted in order to precisely level the carriage.

Vertical columns 54 through 57, forming integral parts of the frame of the apparatus, have been previously described. Each of these columns forms a vertical guide for a respective one of four sliding brackets, two of which are identified at 105, 106, left and right, FIG. 10. Two of these brackets form a pair supporting track 98. The other two form a second pair supporting track 99. The main carriage is thus mounted for guided vertical translation in order that it and all parts carried thereby may be elevated a distance of about 35 cm. to facilitate servicing, repairs and replacements of the shaping rod assemblies and parts otherwise not readily accessible.

This vertical translation is effected, when desired, by the admission of fluid under pressure to a pair horizontally-disposed hydraulic cylinders, 107, FIG. 8, and 108, FIG. 9, each pivoted at its end in a respective bearing block 107a, 108a, secured to top longitudinal beams 61 and 60, respectively. Referring in particular to FIG. 8, track 99 has a short horizontal guide 109 secured to its upper surface. A roller 110 is journaled on one end of a link 111, and fits guide 109 for guided linear movement therealong. The other end of link 111 is pivoted at 112 to a bearing 113 fixed to the under side of beam 61.

A second short horizontal guide 114 is secured to beam 61 in spaced relation with bearing 113, and receives and horizontally guides a roller 115 journaled on the end of piston rod 116 of cylinder 107. A link 117 has its ends pivoted respectively to the axis of roller 115 and to a point between the ends of link 111. By this construction, admission of pressure fluid to cylinders 107, 108, effects the elevation of carriage 97 and all parts connected therewith. The cylinder may be double acting and thus operable to positively hold the carriage in its lowermost or operating position. Suitable stops not shown determine this lower position. Since the connection of the piston rod of cylinder 108 to track 98 is a dupiicate of the one just described, it is sufficient, referring to FIG. 9, to identify guide 118, roller 119, link 120, bearing block 121, guide 122, roller 123, and link 124. The pivot axes of cylinders 167 and 108 are in transverse alignment as are the axes of links 111 and 120, as well as all other corresponding pivot axes of the two connections.

Translation of main carriage 97 and all parts carried thereby, on and along tracks 98, 99, is effected by a hydraulic cylinder 125, FIG. 8, pivo:ed at 126 to track 99 and having the end of its piston rod pivotally connected to the carriage. The cylinder is double acting so that the carriage may be positively moved in either direction, parallel to the direction of travel of the sheets.

Main carriage 97 supports a second or shaping carriage 127, FIG. 10, for limited vertical guided movement with respect thereto. This movement need only be of the order of 1 cm. and is effected by a hydraulic cylinder 128 fixed in central vertical position on carriage 97 and having its piston rod attached at 129 to the shaping carriage. As shown upon this figure, the laterally-spaced depending pairs of arms of carriage 97, two of which are identified at 130, 131, are provided at their lower ends with caps 132, 133 which have inwardly projecting fingers, each apertured to slidably receive with a smooth fit, a respective one of guide rods 134, 135, both fixed with shaping carriage 127. Since there are four of these rods, carriage 127 is accurately guided for limited short vertical movement with respect to main carriage 97, under force exerted by cylinder 128.

The lower ends of rods 134, 135, etc. are attached to a horizontal plate 136 which carries (a) the sheet centralizing means subsequently described, and (b) the upper shaping form 125. From FIG. 10 it is noted that this form is shaped complemental to the curved form conjointly defined by rod assemblies 3.

THE SHEET CENTRALIZING MECHANISM

As previously stated, means are provided to effect any necessary shift of each sheet as it moves onto the assemblies 3, in order that its central or center line may be precisely aligned with the center line of the surfaces conjointly defined by the rods, parallel with the direction of travel of the sheets. Such means are shown in detail upon FIGS. 16 and 17, in the form of depending arms having at their lower ends, fingers which are operated to engage the side edges of the sheet, in flat condition, that is, before being shaped, and to effect any lateral shift thereof required to centralize it as aforesaid. It will be understood that there are four or more of these devices like the one shown upon FIGS. 16 and 17. At least two will engage each side edge and one at each of the leading and trailing edges, and all are operated together toward and into contact with the sheet.

Plate 136 has been previously described in connection with FIG. 10. Each of the centralizing units as depicted upon FIGS. 16 and 17, comprises a hollow body 137 mounted on plate 136. At its top the body has horizontally-opposite openings in which hydraulic cylinders 138, 139 are fixed. The pistons of these cylinders are connected to the respective arms of a cross-shaped member 140. Introduction of fluid under pressure into cylinder 138 moves member 140 to the right, FIG. 17. Similarly the member is positively moved to the left by fluid introduced into cylinder 139. Member 140 has a vertical slot 141 in and through its central portion.

A hollow cylinder or guide 142 is mounted within body 137 for limited guided vertical sliding therein, and for pivoting about an axis parallel with the direction of movement of the sheets. A centralizing lever 143 is vertically slotted from its upper end downwardly as indicated at 144. This slot receives the lower end of member 140. Lever 143 is pivoted at its upper end as shown at 148, to a pair of aligned trunnions secured to guide 142 and projecting radially inwardly therefrom. A pin 145 has its ends fixed in 143 and passes with a smooth sliding fit through slot 141 in member 140.

Figures 16, 17, 19:
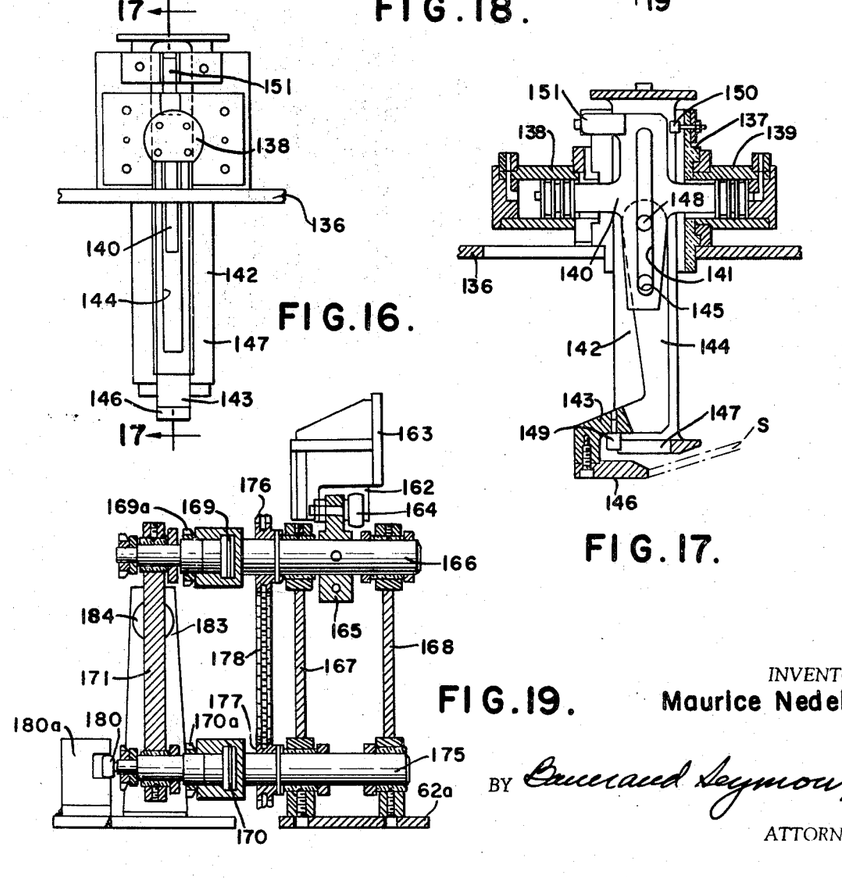
FIG. 16 is a detail side elevation of the means by which the sheets are centralized on and with respect to the shaping rod assemblies.
FIG. 17 is a section taken in a plane identified by line 17—17, FIG. 16, looking in the direction of the arrows.
FIG. 19 is a sectional view taken in a plane identified by line 19—19, FIG. 18, looking in the direction of the arrows.

The lower end of lever 143 is offset laterally, as clearly shown upon FIG. 17, and has a sheet-contacting finger 146 removably and replaceable secured to its lower end. The lower closed end 147 of guide 142 forms an abutment for a pin 149 carried upon lever 143, so that the latter is positively stopped in its swinging motion about pivot 148. Pivotal motion of the lever is, in a way obvious from inspection of FIG. 17, effected in one direction or the other by the admission of fluid under pressure to cylinder 138 or 139, depending upon the desired direction, through the resulting shift of cross member 140. In the position shown upon the figure the piston in cylinder 138 has moved lever 143 to the operating position wherein finger 146 has engaged the edge of sheet S. The action of these fingers on and along the two side edges of the sheet is to, first, centralize the flat sheet about to be shaped, on and with respect to the shaping rod assemblies while they are in their 0° positions, then to hold it in such position until it has been fully shaped.

Still referring to FIGS. 16 and 17, body 137 carries an adjustable abutment 150, limiting motion of cross member 140 to the right, as viewed upon FIG. 17. Means generally identified at 151 act to positively guide member 140 in translation, horizontally in the plane of the figure. It is also important to note that because of the fact that fingers 146 move in an arcuate path about their respective pivot axes 148, the finger 146 of each assembly is at a level just above the flat sheet when it is moved onto the shaping rods in their 0° position.

Since the edges of the sheet move slightly vertically during transformation from flat to curved shape, a corresponding movement is imparted to the fingers, in unison with pivoting of rod assemblies 3. For this purpose the upper carriage assembly is provided with two guide rods shaped precisely like rod assemblies 3. One of these is identified at 152, FIG. 10, from which it is noted that its straight ends are journaled in bearings such as 153 fixed with carriage 97, so that both guide rods move vertically as a unit therewith. These rods are connected for rotation in synchronism with assemblies 3, by a lever arm like 154, fixed to the right end of each, as viewed upon FIG. 10. The free ends of these levers are connected by a link 155 which has a pin 155a, FIG. 8, at its left end.

Bar 91 which, it will be recalled, is translated by cylinder 82, to pivot the shaping rods, also has an abutment 91a secured to its left end. This abutment engages, but is not connected with, one end of a short lever 255 pivoted between its ends to one column of the frame. The other end of the lever is pivotally attached to a T-shaped slide 256 mounted for vertical and horizontal translation in a guide member 257. The slide is held against angular movement by a parallelogram link 260. The cross arm of slide 256 has its ends connected respectively with a link 258 and a lever 259. The latter is pivoted intermediate its ends to the frame and has its other end attached at 155a to link or connecting rod 155.

Thus, as bar 91 moves to the right, FIG. 8, a like translation is imparted to rod 155 and the two guides 152 are pivoted in unison with the shaping rod assemblies. However, since there is no positive connection between abutment 91a and lever 255, bar 91 may move in the opposite direction without effect upon this lever and the parts moved thereby. Therefore retraction of the bar to the left, leaves the guides 152 in the positions to which they have been pivoted by its translation to the right. As has been previously explained, rod assemblies 3 are maintained in their rotated or shaping positions by hydraulic cylinders such as 68, FIG. 15, so that after pressure fluid has been admitted to cylinder 82 to thereby pivot all rods 3 to shaping position, and fluid has been admitted to cylinders 68 to hold them in this position, pressure may be admitted to cylinder 82 at the other side of the piston therein, to restore bar 91 to retracted position in readiness for the next cycle. In order to maintain the two guide rods 152 in their pivoted operating positions, they are connected through link 155 with a hydraulic cylinder 160, FIG. 8. Connection is effected through a lever 161 pivoted intermediate its ends to carriage 127, and having its ends connected respectively, with the piston rod of the cylinder and the link.

Each of the centralizing assemblies as described in connection with FIGS. 16 and 17, is carried by a respective one of a like number of parts or slides. Two of these, 158, 159 are shown upon FIG. 10, mounted for equal and opposite sliding adjustment on and along rod 152. Two like slides, not shown, are similarly mounted upon the other guide rod, previously described. The slides are adjustably fixed to the respective rods upon opposite sides of the vertical center plane of the machine, and which is normal to the plane of FIG. 10, through cylinder 128, and symmetrically with respect to this plane. The adjustment is such, of course, that when under the admission of pressure fluid simultaneously to all cylinders such as 138, FIG. 17, fingers 146 pivot inwardly in unison and engage the opposite side edges of sheet S. If the sheet was not properly centralized, the operation of the fingers positively shifts the sheet laterally to effect such centralization, and to hold it centralized while it is being shaped. In this way, all sheets in any given run or batch are precisely alike.

The mold or form which is pressed down upon the sheet to shape it into conformance with the surface conjointly defined by the rod assemblies in their upwardly pivoted or angular position, is identified at 25 and may be similar to the one previously described in connection with FIG. 1. This mold or form is supported from plate 136 and is therefore guided for vertical movement with carriage 127 through the short distance required to raise it out of operating position. As will be seen from FIG. 10, when rods 3 have been rotated into coplanar relation to receive a flat sheet from oven 1, the base plane is well below the shaping surface of form 25, so that a small vertically upward displacement of the form is sufficient.

THE MEANS FOR COMPENSATING RATE OF TRAVEL OF MAIN CARRIAGE

In rotating from their 0° or coplanar positions, to full selected shaping positions, rod assemblies 3 turn clockwise as viewed upon FIG. 12. Thus each point of the curved portions thereof has a component of movement in the direction of travel of the sheets. Since main carriage 97 is being then translated at the constant speed determined by the rate of rotation of the sheaths or tubes 12 of the rod assemblies 3, this added component of horizontal movement of the sheets will produce a relative translation in the direction of travel, between them and form 25, and which, unless compensated, will mar or mark the hot plastic sheets. Consequently the apparatus being described acts to temporarily and variably increase the speed of carriage 97 and form 25 carried thereby, by an amount sufficient to maintain the form and sheet relatively motionless. Of course, after the rod assemblies have arrived at their predetermined or preset limiting angles of rotation, further speed compensation is unnecessary because during the remaining period of shaping of a sheet, carriage 97 is translated at precisely the same speed that the sheet is moved by rotation of flexible tubes 12.

During the angular movement of the rod assemblies from 0° to the pre-set limiting angle, which may have any value up to 90°, the speed of the horizontal component of movement of the point at the center of the arc of the rods is a function of (a) the rate of the tubes on and with respect to their cores, (b) the instantaneous angular position of the plane of each rod with respect to the base plane, (c) the rate of rotation of the rod assemblies, each about its own axis 6, and (d) the radius of the point in question from the axis of that particular assembly. Since item (d) is constant for any given apparatus, it is taken into account in the parameters of the compensating apparatus.

Compensation for the foregoing additional component of linear translation of the rod assemblies, is effected by a cam 162 connected for operation by bar 91. For example, a bracket 163 carrying the cam, may be attached to the bar for movement as a unit therewith. This cam in its translation, engages a roller 164 journaled on the end of a lever 165 which, in turn, is pinned to shaft 166. This shaft is journaled in a pair of bearing supports 167, 168, spaced upon opposite sides of lever 168. These supports are fixed to any convenient part of the frame 62, as indicated at 62a. As shown in dotted lines upon FIG. 18, the lever has a total movement of 90°, from 45° on one side of the vertical plane through the axis of shaft 166, to 45° on the other side thereof. In the position shown, links 169, 170 are parallel to the direction of movement of cam 162, while in their other limiting position they are at right angles to such direction.

These links are mounted at the left side of supports 167, 168, as seen upon FIG. 19, and together with a connecting link 171, constitute a deformable and adjustable parallelogram. Links 169, 170 are each provided with a longitudinally-extending undercut channel so that each can slide on and be adjusted radially of the left ends of a respective one of shafts 166 and 175. However, each link is constrained to turn as a unit with its shaft. Each link can be adjustably secured in a selected position radially of its shaft, as by a nut 169a for link 169, and 170a for link 170. Thus the distances of pivot 172 from the axis of shaft 166, and of pivot 173 from the axis of shaft 175, may be varied from zero to about 125 mm. Of course in any adjustment the two distances are maintained equal; and when the distance is zero, pivots 172, 173 are coaxial of shafts 166 and 175, respectively. Since the links 169, 170 may turn 90° clockwise from the position shown upon FIG. 18, a chain 178 connects sprockets 176 fixed to shaft 166, and 177 fixed to shaft 175, for the purpose of preventing a dead center lock-up when in the 90° position.

A guide 180a is fixed to the frame at the left, as viewed at FIG. 19, and defines a horizontal track radial of the axis of shaft 175. A slide 180 rides in or on this track and carries a roller 179 which, as appears from FIG. 18, contacts link 171. The piston rod 181 of a hydraulic cylinder 182 is also connected to slide 180. This cylinder has an internal cross section of the same area as that of cylinder 125 which, it will be recalled, operates main carriage 97 in the direction of travel of sheets S. The two cylinders are interconnected by piping not shown, so that oil expelled from cylinder 182 is forced into cylinder 125 and thus proportionately increases the speed of translation of the carriage.

Due to the construction just described, rotation of shaft 166 by translation of cam 162, effects a like rotation of link 169 and, through link 171, of link 170. Link 171 in turn shifts roller 179 and slide 180 to the left, FIG. 18, and expels oil from cylinder 182 at a proportional rate. By setting pivot points 172, 173, each from the axis of its respective shaft 166 and 175, a distance proportional to the rate of rotation of the flexible tubes 12 upon cores 11, oil is transferred from cylinder 182 to cylinder 125, at a rate which causes the latter cylinder to effect an added component translation to carriage 97. This component is very closely equal to the added component of translation of the sheet due to rotation of the rod assemblies 3 to their shaping positions, so that there is no relative movement between the sheet being shaped and the upper form 25.

Returning to FIGS. 18 and 19, bracket 183 is fixed to base 62a and pivotally mounts the end of a hydraulic cylinder 184, whose piston rod is attached at 185 to a projection 186 fixed to link 169. At the terminus of the cycle, fluid is admitted to cylinder 184 to return the parts to the positions shown, FIG. 18, in readiness for the next cycle.

THE TEMPERING AND COOLING APPARATUS

Figure 20:
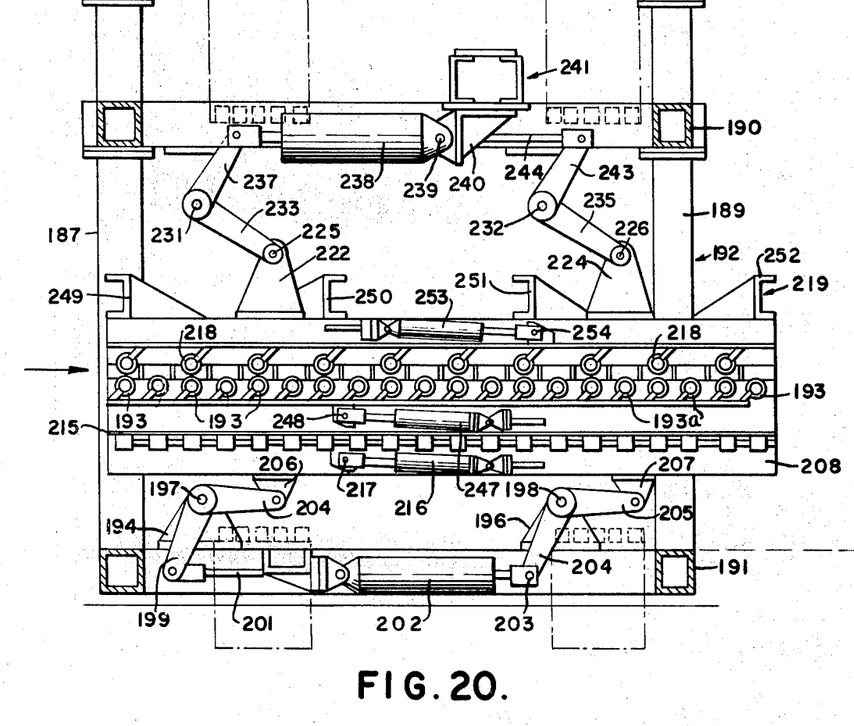
FIG. 20 is a side elevation of the cooling and tempering section of the apparatus.
Figures 21, 23:
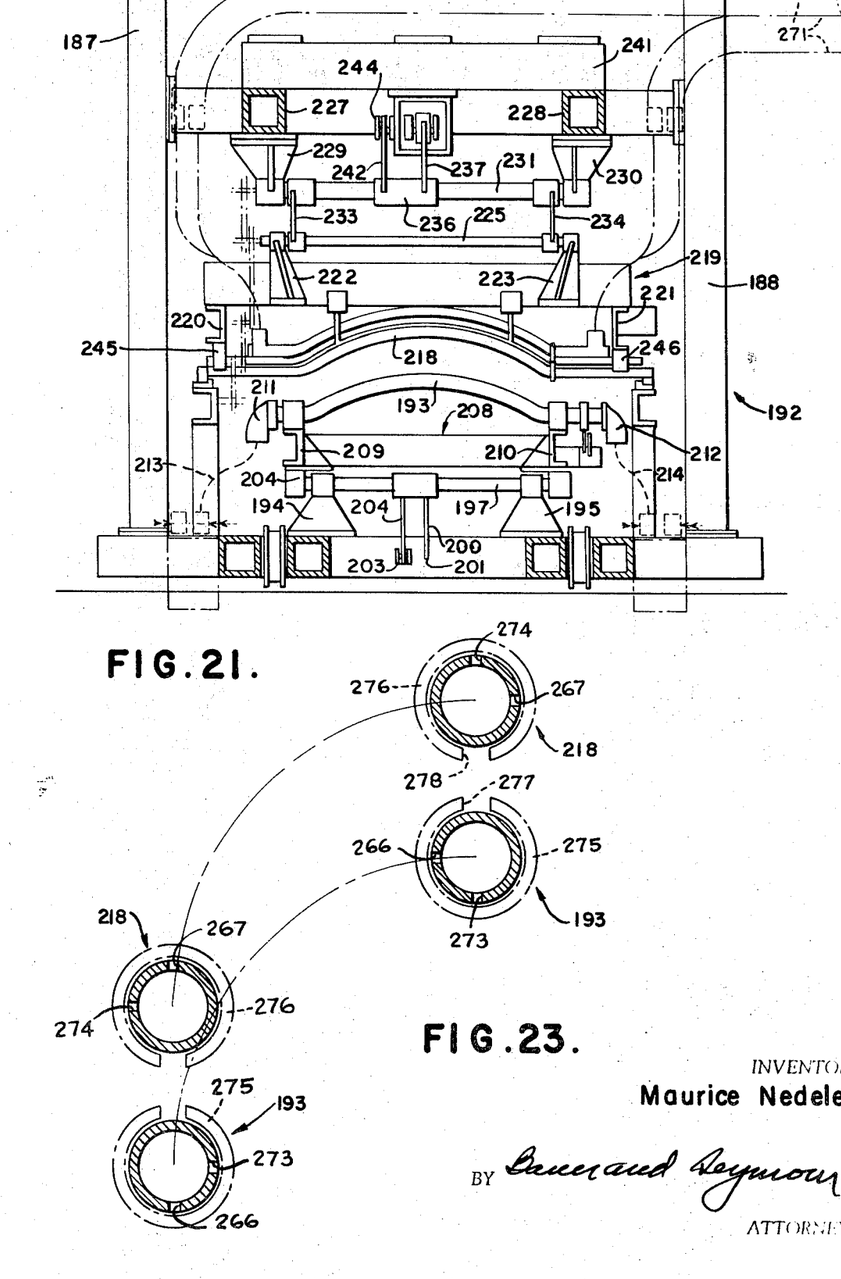
FIG. 21 is an end elevation corresponding to FIG. 20.
FIG. 23 is a view to an enlarged scale, showing the paths of movement of the rods depicted upon FIG. 22.

The tempering and cooling section of the apparatus is shown upon FIGS. 20 and 21, and includes a frame with four vertical columns such as 187, 188, 189, interconnected by transverse and longitudinal beams at their top and bottom ends, as indicated generally at 190, 191, etc., FIG. 20, to form a rigid frame 192.

The lower shaping or curved tubes, one of which is identified at 193, are carried by two pairs of brackets like 194, 195 and 196, secured to the base of frame 192. First and second horizontal shafts 197, 198 are journaled each by a respective pair of these brackets. At their center portions, between brackets, the shafts are provided with respective lever arms 199, 200, fixed thereto. The arms are parallel and their distal ends are interconnected by a link 201 so that they are constrained to pivot in unison. The end of a piston rod in hydraulic cylinder 202, FIG. 20, is connected at 203 to an arm 204 fixed to shaft 198, adjacent arm 200.

Parallel lever arms such as 204, 205, FIG. 20, are attached, one to each end of each shaft 197, 198, and the distal end of each is pivoted to a respective one of a like number of bearing blocks such as 206, 207. These blocks are fixed to the under side of a rectangular horizontal frame generally identified at 208. Thus introduction of pressure fluid into one end or the other of cylinder 202, effects a vertical component movement of the frame.

Frame 208 carries spaced longitudinally-extending channels 209, 210, at respective sides thereof. These channels support a plurality of bearings in fixed spaced relation. Each bearing of one beam is directly opposite and forms a pair with a corresponding bearing on the other beam. Each pair of these bearings journals the straight aligned ends of a respective one of the lower curved tubes 193, previously mentioned. Except for being hollow and of larger diameter, these tubes may be similar to those previously described in connection with shaping rod assemblies 3. These tubes 193 and their upper counterparts 218, are subsequently described in connection with FIGS. 22 and 23.

In a manner which has been described for rod assemblies 3, each tube 193 has its own lever arm attached to one straight end thereof and the distal end of all levers are pivotally connected to a rod 215. The piston rod of a hydraulic cylinder 216 is pivotally attached at 217 to connecting rod 215, so that by the introduction of pressure fluid into one end or the other of this cylinder, tube assemblies 193 may be pivoted from 0° to 90° with respect to the plane common to their axes of pivoting. Since tubes 193 have the same arcuate curvature as assemblies 3, they may be thus pivoted as a unit to conform to the surface of any given run or batch of sheets S coming from the shaping section of the apparatus. Thus the curvature of each sheet is preserved and no further bending moments are applied to it during cooling and tempering.

A set of upper cooling tubes 218 is provided for engagement with the upper surface of the sheets as they pass through the tempering section of the apparatus. An upper rectangular frame generally identified at 219, is mounted for vertical movement within frame 192, and includes a pair of longitudinally-extending beams 220, 221. Two cross beams secured to the tops of these, each carry a pair of transversely aligned bearing blocks such as 222, 223, FIG. 21. One of the second pair of these blocks is identified at 224, FIG. 20. Each pair journals the respective ends of a pair of shafts 225, 226.

Referring particularly to FIG. 21, longitudinal beams 227, 228, forming a part of frame 192, each carry a pair of bearing blocks such as 229, 230, depending therefrom. Each block at one side of the apparatus, forms a pair with a block directly opposite at the other side. Each pair journals a respective one of transverse horizontal shafts 231, 232 in positions clearly shown upon FIG. 20. A pair of lever arms such as 233, 234, FIG. 21, are fixed to the shafts in parallel relation, each adjacent a respective one of the bearing blocks. Thus, upon FIG. 21, one pair is identified at 222, 223. One arm of the other pair is shown at 235, FIG. 20. Returning to FIG. 21, shaft 231 has a central collar 236. An arm 237 extends radially from this collar and its distal end is pivoted to the piston rod of a hydraulic cylinder 238, in turn pivoted at 239 to a bracket 240 fixed to support 241 forming a part of frame 192. A radial arm 242 is fixed to the collar and a second arm 243 is fixed to shaft 232. The two arms are interconnected in parallel relation, by rod 244 so that in a way clear from inspection of FIG. 20, introduction of fluid under pressure to one end or the other of cylinder 238, effects a desired vertical component movement of upper frame 219.

Beams 220, 221 of the upper frame, each have sets of bearing fixed in spaced relation to and along their lower surfaces. Two of these are shown at 245, 246, FIG. 21. Each bearing on one beam forms a pair of with the aligned bearing directly opposite on the other beam. Each pair journals the respective ends of one of the cooling tubes 218. From FIG. 20 it is noted that there is shown but one upper cooling tube for each alternate one of the lower tubes 193. However, if desired, the two sets may be equal in number. All upper tubes 218 are of the same shape as the lower ones 193, and are interconnected for pivoting in unison in the same way, that is, by a lever arm secured to the straight end of each tube and a rod pivoted to and connecting all of the lever arms in parallelism. It is thus sufficient to identify hydraulic cylinder 247, FIG. 20, having the end of its piston rod pivoted at 248 to the rod connecting the aforesaid lever arms. Thus, admission of fluid under pressure to cylinder 247, operates to pivot all upper cooling tubes 218, as a unit.

When each one upper arcuate tubes 218 is brought into cooperative relation with a respective one of lower tubes 193, it is desired that the two be in contiguous relation. Both upper and lower tubes have flexible sheathing like 12, FIG. 4, except that the sheathings are provided with apertures for egress of cooling and tempering air or other fluid.

Hence it is desirable that each pair be essentially in vertical registration while the sheets are passing between them. Since lower tubes 193 may have any angular adjustment each about its own axis, between 0° and 90° with respect to the base plane through these axes, means are provided to longitudinally shift all upper tubes 218 as a unit, in the direction of travel of the sheets.

Such a function may be effected by making beams 220, 221 slidable longitudinally, that is, in the direction of their length and parallel to the direction of travel of the sheets, on and with respect to cross beams 249, 250, 251 and 252, FIG. 20. A hydraulic cylinder 253 has its end pivoted to a convenient part or bracket fixed with one of the cross beams, and its piston rod pivotally attached at 254, to longitudinally translate all of the upper tubes 218 as a unit, by and in response to the admission of pressure fluid into one end or the other of the double-acting cylinder 253. In this way each upper tube may be brought into superposed relation with respect to its counterpart one of tubes 193. The positions are indicated upon FIG. 23, where the tubes are shown in their 0° or lower adjustment, and also in their 90° upper locations. The arcuate path of each in its movement between these two positions is shown in dot-dash lines.

Figure 22:
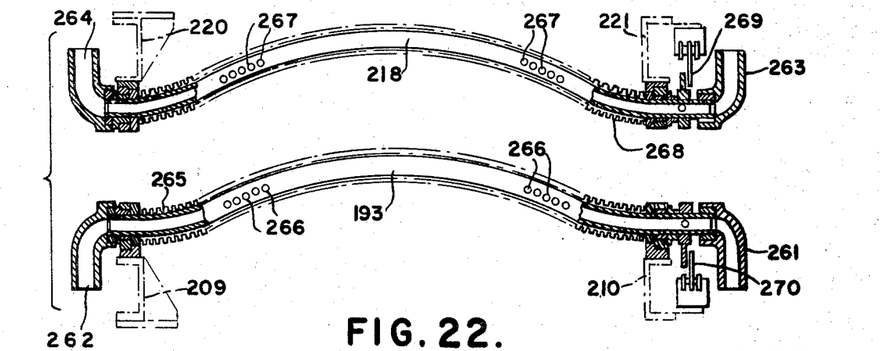
FIG. 22 is a view to an enlarged scale, showing one pair of the curved supporting rods used in the cooling and tempering section of the apparatus.

FIG. 22 shows one pair of the upper and lower cooling tubes. The ends of each are equipped with elbow fittings 261, 262, for tube 193, and 263, 264 for tube 218, by which cooling fluid such as air, is introduced into them from each end. The flexible hose lines by which air is conducted to each tube are indicated by dot-dash lines 271, FIG. 21, for the upper tubes, and at 213, 214, for the lower ones.

Referring particularly to FIGS. 22 and 23, tubes 193 each have two rows of longitudinally-spaced holes. One row is indicated at 266, FIGS. 22 and 23, the other at 273, FIG. 23 only. A first row of holes is shown at 267 for tubes 218, and a second row at 274, FIG. 23. The tubes rotate 90° about their axes as they turn from the upper position to the lower one. The rows of holes are only long enough to subtend the width of the sheets of maximum width which the apparatus is designed to process.

Each set of tubes 193 and 218 is sheathed by a respective one of a plurality of flexible corrugated tubes as indicated at 275 for the lower tubes and at 276 for the upper ones. Each sheath fits loosely about its tube and has a series of longitudinally-extending slots therein, as indicated at 277, 278 for the lower and upper tubes, respectively. The slots are positioned facing each other so that air emerging therefrom is directed against the two surfaces of each sheet as it passes between the tubes. By conventional means not shown, the sheaths 275, 276 are held against rotation as tubes 193, 218 revolve between the two limiting positions shown upon FIG. 23, so that the slots 277, 278 remain facing each other and always direct tempering fluid directly against the respective surfaces of the sheet, for all angular adjustments of the tubes.

It has been noted in connection with FIG. 20, that there is but one upper tube 218 for each alternate one of lower tubes 193. The lower tubes such as 193a, each lying between a consecutive pair of upper tubes 218, have the same general construction as tubes 193, but act as transport rollers to pass the sheets through the tempering section B. For this purpose they are not equipped with rows of apertures like 266, 273. Nor are their flexible corrugated tubes slotted as described for tubes 193. The corrugated tubes of each item 193a are interconnected for rotation in unison in the same manner as has been described for flexible tubes 12, FIG. 4, and driven by power means not shown. Thus the sheets are transported through the tempering chamber by tube assemblies 193a and tempered and cooled by fluid directed against their respective surfaces by assemblies 193 and 218.

It will be understood that frame 192 is provided with enclosing top, bottom and side walls, not shown, as well as with apertured end walls for entrance and exit of the sheets.

OPERATION

Hot plastic flat sheets emerge on rollers 63 from oven 1 and pass directly to the rod assembiles 3 which are at this time in 0° or coplanar positions, each about its own axis 6. The sheath tubes 12 are rotating at the desired rate of translation of the sheets. As soon as a sheet arrives at fully emplaced position upon the shaping forms, fluid is introduced into all cylinders 138 of the centralizing finger assemblies and move fingers 146 in unison toward the sheet. The fingers engage the edges of the sheet at a selected number of points spaced about its periphery; and if the sheet is not already correctly positiond, the fingers act to positively shift it into such position. The fingers are maintained in contact with the sheet until it is fully shaped.

Next, fluid under pressure is introduced into the upper ends of all cylinders 94 to pivot each lever 93 into the path of the rollers 95, each one of which lies a little to the right of its stop lever 93, as the parts are viewed upon FIG. 12. The levers are thereby rendered operational. Fluid is then introduced into cylinder 82 to move bar 91 to the left, FIG. 12, or, what is the same thing, to the right, FIG. 8. All rod assemblies 3 are thus pivoted from their coplanar positions, until the roller 81 of each, abuts its stop 78, which have been previously set for the desired shape or curvature of the sheets being produced.

Simultaneously, as bar 91 moves, it acts through linkage 255, 256, etc., FIG. 8, to pivot the two guide rods, one of which is identified at 152, FIG. 10. These rods are thus turned, each in its own pair of bearings to elevate slides 158, 159 and the other pair on the guide rod not shown, at the same rate as the vertical component movement of the side edges of the sheet, so that fingers 146 remain in contact therewith. Of course, all of these slides have been previously fixed in adjusted locations on and along the guide rods, in accordance with the width of the particular batch of sheets being shaped. Since, as previously explained, bar 91 may return to its initial position as soon as the assemblies 3 have been turned to the desired shaping position, fluid is now introduced into cylinder 160 to hold these guide rods in their pivoted and shaping positions.

Figure 18:
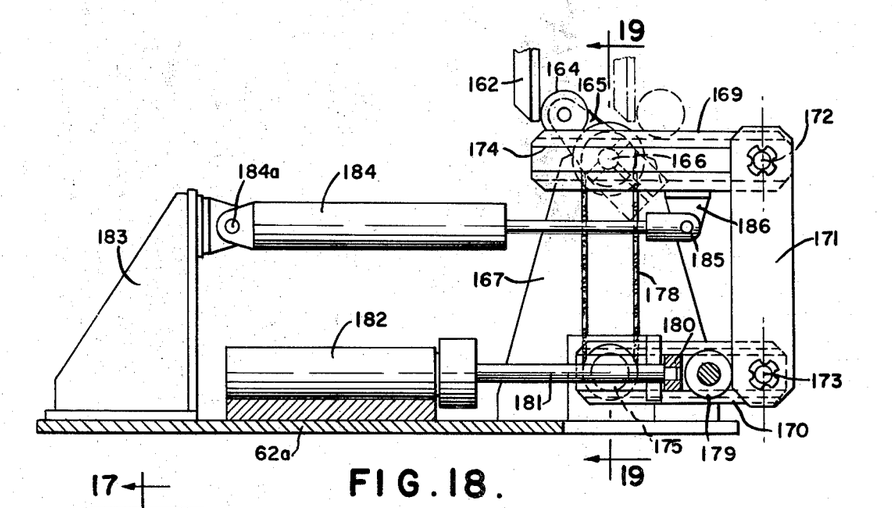
FIG. 18 is a side elevation of mechanism forming a part of the invention, for compensation for the speed of the principal carriage.

Fluid has been admitted to cylinder 108 to hold tracks 98, 99 in their lowermost position against adjustable stops, not shown. As soon as the sheet is properly emplaced and centralized upon the rising assemblies 3, fluid is admitted to cylinder 128 to move shaping carriage 127 to its lowermost or operating position. Also, fluid is admitted to cylinder 125, FIG. 8, to translate this carriage, plate 136, and form 25, in the same direction and at the same speed as the sheet is moving on and along the rotating tubes 12. While the various operations are necessarily described in sequence they take place practically simultaneously, so that form 25 is lowered in timed relation with the pivoting of rod assemblies 3. Thus the compensating means of FIGS. 18 and 19 is in operation due to movement of cam 162 as a unit with bar 91, and is thus forcing oil from cylinder 182 into cylinder 125 to thereby temporarily increase the rate of translation of carriage 127 by an amount equal to the instantaneous horizontal component of linear movement of the center points of the arcs of the shaping rods. As soon as the rods are stopped, each by its abutment 78, further transfer of pressure fluid is cut off and by means of fluid continuously supplied to cylinder 125 translation of carriage 127 is continued at a rate equal to the linear speed of the sheet due solely to rotation of flexible tubes 12. Fluid may be forced into cylinder 125 by a variable volume pump, not shown.

Thus during the remainder of the shaping cycle, form 25 presses the sheet down into full conformance with the surface conjointly defined by the elevated assemblies 3; and as soon as the leading edge of the sheet has been detected by means such as the photoelectric cell 31, FIG. 1, signaling that the sheet is about to enter tempering section B, fluid introduced into the lower end of cylinder 128, raises carriage 127 and elevates form 25 from contact with the sheet. Fluid is admitted to the piston rod end of cylinder 125 and returns main carriage 197 and all parts supported thereby, to initial position in readiness for the next cycle.

After rod assemblies 3 have been fully elevated and are being held elevated by pressure in cylinders 68, fluid is admitted into all cylinders 94 below the pistons therein. This acts to pivot each stop lever out of the path of its roller 95. Fluid is then admitted to the pivoted end of cylinder 82 to return bar 91 to initial position, so that each lever 93 now lies to the left of its roller 95, as the parts are viewed upon FIG. 12.

Immediately upon completion of shaping, fluid is admitted to cylinder 82 to again shift bar 91 to the right. This operates to pivot all assemblies 3 into the base plane, ready to receive the next sheet from oven 1.

In the tempering section, rod assemblies 193 and 193a remain in the position to which they have been pivoted, so that their arcuate portions conjointly define a surface of the same curvature as the sheets being shaped in section A. By admission of pressure fluid to cylinder 253, upper tubes 218 have been translated so that when pivoted into contiguous relation with the upper surface of the sheet, each tube 218 will be vertically above a corresponding lower tube 193.

Likewise the admission of fluid under pressure into cylinder 202, FIG. 20, elevates the entire assembly so that the surface conjointly defined by the pivoted tubes 193a will be in registration with the like surface conjointly defined by rod assemblies 3. Thus the sheet passes to and is supported on and translated by the rotating flexible tubes of 193a, while jets of cooling and tempering fluid from slots 277 and 278 are directed against the respective surfaces of the sheet in uniform distribution thereover until when it emerges from between these tubes at the far end of the housing, it is fully tempered and cooled.

It should be added that as soon as levers 93 have acted to return all rod assemblies 3 into the base plane, fluid is again admitted to cylinders 94 to pivot levers 93 out of the paths of rollers 95. Fluid is then passed to cylinder 82 to actuate bar 91 and return each lever to the right of its roller 95. The levers 93 are then again elevated to the position shown at FIGS. 11 and 12, in preparation for the next cycle.

As will be clear from the foregoing, the invention is well adapted for essentially complete automation. The flow of fluid to each of the hydraulic cylinders may be under the control of respective ones of a number of electromagnetic balanced valves of the piston type, for example, not shown. The sequential or simultaneous operation of the several valves as required by a cycle, may be under the control of a rotatable master commutator having axially-spaced tracks, one for each valve. Brushes, one for each track will control relay circuits which, in turn, control the valves in the proper sequence and time durations of opening and closing. The commutator may be rotated at a desired rate by a variable speed electric motor connected therewith. Each full rotation of the commutator will correspond to a complete cycle and effect control of the oven, the shaping section and the tempering and cooling section, if desired.

The operation of the form of the invention shown upon FIGS. 6 and 7 is essentially the same as that just described. The only difference is that form 25 is replaced by upper rod assemblies 3b formed and mounted in the same manner as assemblies 3, but disposed above the sheet. These rods 3b are mounted for pivoting as a unit each about its own axis 48, FIG. 6, and are mounted for limited adjustment as a unit, vertically and horizontally. Each rod 3b is provided with adjustable stop means like 73 and 68, FIGS. 13 and 14, and a cylinder like 68, FIG. 15.

The rods are adjusted horizontally as a unit so that when pivoted downwardly to operating positions, each is in vertical registration with a respective one of rod assemblies 3, as indicated at FIG. 6. Thus as the hot sheet, in flat condition, moves fully onto assemblies 3, assemblies 3b are pivoted downwardly to press the sheet into full conforming relation with the curved surface conjointly defined by assemblies 3. Since the corrugated sheathing tubes of both the upper and the lower assemblies 3 and 3b are being rotated at the same linear rate of peripheral speed, each sheet passes smoothly between them and is completely shaped by the time it transfers to the tempering section of the apparatus.

This form of the invention has the advantage that for each pivotal adjustment of assemblies 3, as determined by adjustment of abutments 78, FIG. 13, assemblies 3b may be correspondingly pivoted, so that it is not necessary to substitute a different upper shape or form, like 25, when a batch of sheets is to be processed, having a different curvature from a run just completed.

While I have disclosed the form and operation of the invention as presently preferred by me, numerous changes, modifications, substitutions of equivalents and variations in form and construction will readily occur to those skilled in the art, after a study of the foregoing description. Hence the disclosure is to be taken in an illustrative, rather than a limiting sense.

Having fully disclosed the invention, what I claim and desire to secure by Letters Patent is:

1. The method of shaping essentially flat sheets, in particular glass sheets, into curved form, comprising, mounting a plurality of like arcuate forms for pivoting, each about its own chordal axis, all said axes being parallel and spaced in a common plane, pivoting all said forms into said common plane, depositing a sheet in plastic condition, onto the forms for support and shaping conjointly thereby, and pivoting the forms in unison, each about its own chordal axis, until they conjointly define a surface of desired curvature.

2. The method of claim 1, and translating the sheet on and along the forms, parallel with said plane, while it is being conformed to said surface.

3. The method of claim 2, and continuing translation of the shaped sheet while tempering and cooling the same.

4. The method of claim 1, and while the sheet is being translated on and along the forms and conformed thereto, exerting pressure thereon to continuously urge the sheet into conformance with the desired surface of curvature as conjointly defined by the forms.

5. The method of claim 4 relieving said pressure after a predetermined distance of translation of the sheet, and continuing translation of the sheet on and along the forms, while directing tempering fluid into contact with the surfaces thereof.

6. Apparatus for shaping flat sheets of pliable material into curved form, comprising, a frame, a plurality of arcuate forms each having a chordal axis, means mounting all said forms in said frame for pivoting, each about its respective chordal axis, all said axes being in spaced parallel relation in a common plane, and means operable to pivot each said arcuate form each about its chordal axis, from a first position wherein all forms are in said common plane, to a second position wherein each said form makes a selected angle with said common plane.

7. The apparatus of claim 6, said last-named means operating to pivot all said forms in unison between said first and second positions.

8. The apparatus of claim 6, and stop means adjustable to limit pivotal movement of said arcuate forms from said first position to any selected angle up to 90° with respect to said common plane.

9. The apparatus of claim 6, each said arcuate form being a rod having straight aligned ends forming trunnions, and a central portion bent into desired curved shape in a plane through the axis of said trunnions.

10. The apparatus of claim 9, said mounting means comprising a pair of laterally spaced parallel bearing beams carried by said frame, one trunnion of each said form being journaled on one said beam, the other trunnion of each said form being journaled on the other said beam.

11. The apparatus of claim 9, and a plurality of flexible tubes each rotatably fitting a respective one of said rods.

12. The apparatus of claim 11, and means connected with each said tube to rotate the same on and about its rod.

13. The apparatus of claim 12, said means operating to rotate all said tubes in unison and at the same peripheral speed.

14. The apparatus of claim 11, each said flexible tube being of corrugated metal.

15. The apparatus of claim 13, and a covering of tubular heat-resistant fabric fitting over and about each said tube.

16. Apparatus for shaping into curved form, flat sheets of plastic material such as hot glass, comprising, a frame, a first plurality of arcuate rods each having straight aligned ends defining a pivot axis, and a central curved portion connecting said ends, bearing means journaling all said rods in said frame, each about its own axis and with said axes spaced, parallel and in a common plane, a plurality of flexible tubes each rotatably fitting on and about a respective one of said rods, second means connected with said tubes to rotate the same in unison, each on and with respect to its rod, third power-operated means connected with all said rods to pivot the same in unison from a first position wherein all lie in the common plane of said axes, to a second position up to 90° with respect to said common plane, first stop means fixed with said frame and limiting rotation of said rods beyond said first position, and second stop means adjustable with respect to said frame and limiting rotation of said rods to any selected angle between said first and said second positions.

17. The apparatus of claim 16, and power-operated means to releasably hold all of said rods in second position.

18. The apparatus of claim 16, each said arcuate rod having a respective one of a plurality of lever arms fixed to a straight end thereof, said third means comprising a bar translatable on said frame in the direction of its length, parallel with said common plane and normal to said axes, adjacent said lever arms, a plurality of assemblies fixed to and in spaced relation along said bar, each said assembly comprising an abutment movable from a first position in the path of movement of the distal end of a respective lever arm, to a second position out of said path, and power-operated means connected with said abutment and energizable to selectively move the same between said positions, each said abutment when in first position being operable to engage and rotate a respective lever arm, by and in response to translation of said bar, and power means connected with said bar to translate the same and, when said abutments are in their said first position, to pivot said rods as a unit between their said first and second positions.

19. The apparatus of claim 16, shaping means conforming to the surface conjointly defined by the curved portions of said rods, a carriage mounted on said frame above said rods for translation parallel with said common plane and normal to said axes, and means mounting said shaping means on said carriage for vertical guided movement with respect thereto, normal to said common plane, onto and from a sheet transported on and along said rods.

20. The apparatus of claim 19, and power means connected with and operable to translate said carriage.

21. The apparatus of claim 20, and means operated by said second means, and connected with said power means, to increase the speed of translation of said carriage, by and in accordance with the instantaneous component of linear movement parallel with said plane, of the curved portions of said rods in moving from their said first to their said second positions.

22. The apparatus of claim 21, said power means comprising a first hydraulic cylinder, said means operated by said second means, comprising a deformable parallelogram linkage and a second hydraulic cylinder in communication with said first cylinder, said second cylinder operating to transfer fluid to said first hydraulic cylinder to temporarily increase the rate of translation of said carriage, by and in response to deformation of said parallelogram linkage, and means operated by said third means to deform said parallelogram linkage and effect transfer of fluid from said second hydraulic cylinder to said first hydraulic cylinder.

23. The apparatus of claim 19, said shaping means comprising a second plurality of rods each having straight aligned ends defining an axis and a central portion curved in conformity with the rods of said first plurality, support means mounting all said second plurality of rods for pivoting, each about its own axis, all in parallel in a second common plane, said common planes being parallel, means operable to move said support means parallel with said planes and perpendicular to said axes, and means connected with said second plurality of rods to pivot the same, each into superjacent relation with a respective one of said first plurality of rods.

24. The apparatus of claim 16, a support mounted over said first plurality of rods for translation parallel with said common plane, normal to said axes, a shaping form carried by said support for movement normal to said plane, into and away from contact with said rods in their said second position, said form having a surface facing said rods, complemental to the surface conjointly defined by said rods in second position, a plurality of centralizing units carried by said support, each including an abutment movable into contact with a respective one of a plurality of points in and spaced about the periphery of a sheet supported on said rods, and operable to centralize the sheet thereon, and means operable to move each said abutment into centralizing contact with a respective point of the periphery of the sheet.

25. The apparatus of claim 24, each said abutment comprising a lever arm pivoted for movement about an axis parallel with and above said plane, and a plurality of sheet-contacting fingers each fixed to the lower distal end of a respective one of said lever arms, each said finger being above the level of its point of contact with the sheet, when its lever arm is pivoted out of sheet-centralizing position.

26. The apparatus of claim 24, and means operable to elevate said abutments as a unit in synchronism with pivoting of said arcuate rods to their said second positions by said third power-operated means.

27. Apparatus for shaping flat sheets of bendable material into curved form, comprising, an oven, a shaping section having shaping means comprising a multiplicity of movable parts of curvature varying according to their position, a tempering section, all conjointly forming a continuous production line, means passing flat sheets from said oven to said shaping section, means continuously and without dwell, translating sheets in and along said shaping section while shaping the same into curved form, and means continuously operating to translate shaped sheets in succession from said shaping section, to and through said tempering section.

28. The method of bending sheet glass, comprising, depositing a glass sheet, at bending temperature, upon a series of curved rods lying in a common plane and each capable of turning about its own chordal axis to any selected position out of said plane, up to and including a position wherein all rods are at right angles to said plane, said rods when in said selected position conjointly defining a shape to be imparted to the glass sheet, pivoting the rods out of the common plane into said selected position, maintaining them in the selected position until the sheet has conformed to the definitive shape conjointly defined by the rods, and cooling the sheet to rigidity while in its definitive shape.

29. A method of shaping a heat-softened sheet of thermoplastic material which comprises disposing the sheet upon a flat bed formed by a multiplicity of similarly curved, rod-like members which are pivotally mounted and lie substantially in a single plane, thereby offering substantial support to the whole sheet, pivoting the curved rod-like members out of their plane against the sheet, thereby forming a curved supporting surface having a materially reduced area of contact with the sheet, maintaining the sheet at bending temperature upon the curved supporting surface until it has conformed to the shape defined by the pivoted, curved rods, and cooling the sheet to hardness.

30. A method of shaping a heat-softened sheet according to claim 29 which comprises disposing the sheet between two flat beds of curved rod-like construction, and bending the sheet between the beds by pivoting the curved rod-like members out of their respective planes, thereby bending the sheet between them.

31. A method according to claim 29 which comprises tempering the hot, bent sheet.

32. A method of bending hot glass sheet which comprises supporting the glass at bending temperature substantially throughout its area upon a surface composed of a multiplicity of curved supporting elements, and forming a new bending surface by adjusting the multiplicity of supporting elements until they define a chosen surface of the bent shape desired in the glass sheet, maintaining the sheet upon the supporting elements at bending temperature until it conforms to the new surface by means comprising gravity, and cooling the bent sheet to hardness.

33. The apparatus of claim 27, and means in said tempering section to direct tempering fluid into contact with both surfaces of each sheet being translated therethrough, said last-named means comprising a plurailty of pairs of tubes curved into arcuate form, the tubes of each said pair being vertically superposed at the level of the sheets passing between them and conforming to the curvature thereof, the upper and lower tubes of said pairs forming, respectively, upper and lower sets, the tubes of each said set having longitudinally spaced apertures through their walls, to direct tempering fluid against respective opposite surfaces of a sheet moving therebetween, and means connected with each said tube to force tempering fluid through the apertures thereof, onto the surfaces of a sheet passing therebetween.

34. The method of claim 29, pivoting the forms to lie in said common plane, moving the sheet to be shaped thereonto, and subsequently pivoting the rod-like members as a unit, each about its own chordal axis, to conjointly define the desired shape into which the sheet is to be conformed.

35. The method of claim 34, and pressing the sheet onto the forms to positively conform it thereto.

36. The apparatus of claim 33, said pairs of tubes being spaced in the direction of travel of the sheets traversing said tempering section, and a plurality of arcuate rods shaped like said tubes, means mounting said rods each between a consecutive pair of said lower tubes, a plurality of flexible tubes each rotatably fitting a respective one of said rods, and means operably connected with said flexible tubes to rotate the same in unison in translation of the sheets between said sets of tubes.

References Cited

UNITED STATES PATENTS

| | | | |
|---|---|---|---|
| 2,526,359 | 10/1950 | Jendrisak | 65—287 |
| 3,223,501 | 12/1965 | Fredley et al. | 65—25 |
| 3,077,753 | 2/1963 | Dammers | 65—106 |
| 3,265,484 | 8/1966 | Ritter | 65—104 |

ARTHUR D. KELLOGG, Primary Examiner

U.S. Cl. X.R.

65—107, 273, 275, 285, 291